United States Patent [19]

Farah et al.

[11] Patent Number: 5,416,148
[45] Date of Patent: May 16, 1995

[54] BLENDS OF POLYCARBONATE AND ETHYLENE POLYMERS

[75] Inventors: Hani Farah, Sugarland; Michael K. Laughner, Lake Jackson; Chai-Jing Chou, Missouri City; Morgan M. Hughes, Angleton, all of Tex.

[73] Assignee: The Dow Chemical Company, Midland, Mich.

[21] Appl. No.: 304,036

[22] Filed: Sep. 9, 1994

[51] Int. Cl.$^6$ ............................ C08F 8/00; C08K 3/10
[52] U.S. Cl. .................................. 524/409; 525/64; 525/146; 525/147
[58] Field of Search ..................... 525/146, 147, 64; 524/409

[56] References Cited

U.S. PATENT DOCUMENTS

| | | |
|---|---|---|
| 3,431,224 | 3/1969 | Goldblum . |
| 3,780,140 | 12/1973 | Hammer . |
| 3,813,358 | 5/1974 | O'Connell . |
| 4,122,131 | 10/1978 | Bussink et al. . |
| 4,172,859 | 10/1979 | Epstein . |
| 4,245,058 | 1/1981 | Liu . |
| 4,384,076 | 5/1983 | Ohara et al. . |
| 4,410,662 | 10/1983 | Witman et al. . |
| 4,430,476 | 2/1984 | Liu . |
| 4,444,950 | 4/1984 | Sakano et al. . |
| 4,496,693 | 1/1985 | Rosenquist et al. . |
| 4,513,119 | 4/1985 | Liu . |
| 4,537,930 | 8/1985 | Bussink et al. . |
| 4,638,033 | 1/1987 | Boutni et al. . |
| 4,710,534 | 12/1987 | Liu . |
| 4,894,423 | 1/1990 | Farah et al. . |
| 5,272,236 | 12/1993 | Lai et al. ............... 526/348.5 |
| 5,278,272 | 1/1994 | Lai et al. ............... 526/348.5 |
| 5,278,272 | 1/1994 | Lai et al. . |
| 5,346,963 | 9/1994 | Hughes et al. ............ 525/285 |

FOREIGN PATENT DOCUMENTS 0122601 10/1984 European Pat. Off. .
1363402 8/1974 United Kingdom .

OTHER PUBLICATIONS

Derwent Abstract 85-200896/33.
Derwent Abstract 83-24144K/10.
Derwent Abstract 82-77367E/37.

*Primary Examiner*—Morton Foelak

[57] ABSTRACT

A blend of polycarbonate and a substantially linear ethylene polymer which has a desirable balance of impact and solvent resistance properties.

43 Claims, No Drawings

BLENDS OF POLYCARBONATE AND ETHYLENE POLYMERS

FIELD OF THE INVENTION

This invention relates to compositions containing polycarbonate and a substantially linear ethylene polymer, and to methods of preparation of such compositions.

BACKGROUND OF THE INVENTION

Polycarbonate has found many uses because, in general, it combines a high level of heat resistance and dimensional stability with good insulating and noncorrosive properties, and it is easily molded. It does, however, suffer from a tendency to craze and crack under the effects of contact with organic solvents such as gasoline. An undesirable result in polycarbonate which has crazed is that it is more likely to experience brittle rather than ductile failure. This disadvantage has been somewhat relieved by the practice of blending polycarbonate with various olefin polymers such as low density polyethylene or linear low density polyethylene, or thermoplastic rubbers such as ethylene/propylene copolymer. These added substances are capable of improving the resistance of polycarbonate to solvents, but they tend to delaminate and cause an offsetting reduction in the toughness, impact resistance and weldline strength of the blended polycarbonate composition. Such delamination, and the resulting loss of utility, is reported, for example, in U.S. Pat. No. 4,496,693.

Impact resistance in polycarbonate can be improved by the incorporation of emulsion or core-shell elastomers such as methacrylate/butadiene/styrene copolymer or a butyl acrylate rubber. However, these core-shell rubbers hinder processability of the blend by increasing viscosity and impart no improvement to the solvent resistance of polycarbonate. It would accordingly be desirable if modifers blended with polycarbonate for the purpose of improving its solvent resistance did not also deleteriously affect its toughness and impact and weldline strength, and cause delamination as evidenced by peeling or splintering in a molded article.

SUMMARY OF THE INVENTION

In one aspect, this invention involves a composition of matter containing, in admixture, polycarbonate and a substantially linear ethylene polymer. In another aspect, this invention involves the inclusion with such a composition of a styrenic copolymer, a supplemental impact modifier and/or an additional molding polymer.

It has been found that articles molded from the compositions of this invention show no tendency toward delamination and exhibit a desirable balance of surprisingly high levels of impact resistance, solvent resistance and processability.

The compositions of this invention are useful, for example, in the production of films, fibers, extruded sheets, multi-layer laminates and molded or shaped articles of virtually all varieties, especially data storage apparatus, appliance and instrument housings, motor vehicle body panels and other parts and components for use in the automotive, electrical and electronics industries. The methods of this invention are useful for preparing compositions and molded articles having applications which are the same as or similar to the foregoing.

DETAILED DESCRIPTION OF THE INVENTION

The compositions of this invention are those in which (a) polycarbonate has been admixed in a polymeric blend with (b) a substantially linear ethylene polymer. The compositions of this invention may, optionally, also contain (c) a styrenic copolymer, (d) a supplemental impact modifier, and (e) one or more additional molding polymers. Suitable ranges of content for components (a) and (b) in the compositions of this invention, and suitable ranges of content for components (c), (d) and (e) if and when they are present, expressed in parts by weight of the total composition, are as follows:

(a) polycarbonate at least about 60 parts, advantageously at least about 70 parts, and preferably at least about 80 parts, and yet not more than about about 99 parts, advantageously not more than about 98 parts, and preferably not more than about 95 parts;

(b) substantially linear ethylene polymer at least about 1 parts, advantageously at least about 2 parts, and preferably at least about 5 parts, and yet not more than about about 40 parts, advantageously not more than about 30 parts, and preferably not more than about 20 parts;

(c) styrenic copolymer at least about 5 parts, advantageously at least about 10 parts, preferably at least about 15 parts, and more preferably at least about 20 parts, and yet not more than about about 75 parts, advantageously not more than about 55 parts, preferably not more than about 50 parts, and more preferably not more than about 45 parts;

(d) supplemental impact modifier at least about 0.1 parts, advantageously at least about 0.5 parts, preferably at least about 1 parts, and more preferably at least about 3 parts, and yet not more than about about 25 parts, advantageously not more than about 20 parts, preferably not more than about 15 parts, and more preferably not more than about 10 parts; and (e) molding polymer at least about 5 parts, advantageously at least about 10 parts, preferably at least about 15 parts, and more preferably at least about 20 parts, and yet not more than about about 75 parts, advantageously not more than about 55 parts, preferably not more than about 50 parts, and more preferably not more than about 45 parts.

The number of weight parts of the various components from which the compositions of this invention may be prepared may, but need not necessarily, total to 100 weight parts.

Also included within this invention are the reaction products, if any, of the above named components when admixed in the compositions of this invention.

Preparation of the compositions of this invention can be accomplished by any suitable mixing means known in the art. Typically the polycarbonate and substantially linear ethylene polymer, and other components or additives which are optionally present in the compositions of this invention, are dry blended in a tumbler or shaker in powder or particulate form with sufficient agitation to obtain thorough distribution thereof. If desired, the dry-blended formulation can further be subjected to malaxation or to shearing stresses at a temperature sufficient to cause heat plastification, for example in an extruder with or without a vacuum. Other apparatus which can be used in the mixing process include, for example, a roller mill, a Henschel mixer, a ribbon blender, a Banbury mixer, or a reciprocating screw injection molding machine. The components may be mixed simultaneously or in any sequence.

When softened or melted by the application of heat, the compositions of this invention are useful for fabrication and can be formed or molded using conventional techniques such as compression, injection molding, gas assisted injection molding, calendering, vacuum forming, thermoforming, extrusion and/or blow molding, alone or in combination. The compositions can also be formed, spun or drawn into films, fibers, multi-layer laminates or extruded sheets, or can be compounded with one or more organic or inorganic substances, on any machine suitable for such purpose.

Component (a) in the compositions of this invention is a polycarbonate, which can be prepared from a dihydroxy compound such as a bisphenol, and a carbonate precursor such as a disubstituted carbonic acid derivative, a haloformate (such as a bishaloformate of a glycol or dihydroxy benzene), or a carbonate ester such as diphenyl carbonate or a substituted derivative thereof. These components are often reacted by means of the phase boundary process in which the dihydroxy compound is dissolved and deprotonated in an aqueous alkaline solution to form bisphenolate and the carbonate precursor is dissolved in an organic solvent. The aqueous alkaline solution has a pH in excess of 7.0, often in excess 8.0 or 9.0, and can be formed in water from a caustic soda, such as NaOH, or from other bases such as those included in the alkali metal and alkaline earth metal phosphates, bicarbonates, oxides and hydroxides. Base is typically used in an amount of about 2 to 4, preferably about 3 to 4, moles per mole of dihydroxy compound.

These components are often reacted by means of a mixture prepared initially from the aromatic dihydroxy compound, water and a non-reactive organic solvent immiscible with water selected from among those in which the carbonate precursor and polycarbonate product are soluble. Representative solvents include chlorinated hydrocarbons such as methylene chloride, 1,2-dichloroethane, tetrachloroethane, chlorobenzene, and chloroform. Caustic soda or other base is then added to the reaction mixture to adjust the pH of the mixture to a level at which the dihydroxy compound is activated to dianionic form.

A carbonate precursor is contacted with an agitated mixture of the aqueous alkaline solution of the dihydroxy compound, and, for such purpose, the carbonate precursor can be bubbled into the reaction mixture in the form of a gas, or can be dissolved and introduced in solution form. Carbonater precursor is typically used in an amount of about 1.0 to 1.8, preferably about 1.2. to 1.5, moles per mole of dihydroxy compound. The mixture is agitated in a manner which is sufficient to disperse or suspend droplets of the solvent containing the carbonate precursor in the aqueous alkaline solution. Reaction between the organic and aqueous phases created by such agitation yields the bis(carbonate precursor) ester of the dihydroxy compound. For example, if the carbonate precursor is a carbonyl halide such as phosgene, the products of this initial phase of the process are monomers or oligomers which are either mono- or dichloroformates, or contain a phenolate ion at each terminus.

These intermediate mono- and oligocarbonates dissolve in the organic solvent as they form, and they can then be condensed to a higher molecular weight polycarbonate by contact with a coupling catalyst of which the following are representative: a tertiary amine such as triethyl amine, dimethyl amino pyridine or N,N-dimethyl aniline; a cyclic aza compound such as 2,2,6,6-tetramethyl piperidine or 1,2-dimethylimidazole; an iminoether or iminocarboxylate compound such as 1-aza-2-methoxy-1-cycloheptene or t-butylcyclohexyliminoacetate; or a phosphonium, sulfonium, arsonium or quaternary ammonium compound such as cetyl triethylammonium bromide. Such a catalyst may be added to the reaction mixture before or after a dihydroxy compound is contacted with a carbonate precursor, and is typically used in an amount of about 0.01 to 0.1 moles per mole of dihydroxy compound.

The polycarbonate forming reaction can be run at a pH from above 7.0 to about 14, and at a temperature between 0° C. to 100° C. although usually not in excess of the boiling point (reflux temperature) of the solvent used. Frequently, the reaction is run at a temperature of about 0° C. to about 45° C.

Upon completion of polymerization, the organic and aqueous phases are separated to allow purification of the organic phase and recovery of the polycarbonate product therefrom. The organic phase is washed as needed in a centrifuge with dilute base, water and/or dilute acid until free of unreacted monomer, residual process chemicals and/or other electrolytes. Recovery of the polycarbonate product can be effected by spray drying, steam devolatilization, direct devolatilization in a vented extruder, or precipitation by use of an anti-solvent such as toluene, cyclohexane, heptane, methanol, hexanol, or methyl ethyl ketone.

In the melt process for preparation of polycarbonate, aromatic diesters of carbonic acid are condensed with an aromatic dihydroxy compound in a transesterification reaction in the presence of a basic catalyst such as sodium methylate, sodium bisphenolate, calcium acetate, phenyl benzoate, N-stearoylphenothiazine, quaternary ammonium chloride, an alkaline(hydroxy)-fluoroborate, an alkali metal salt of benzoic acid, an iminocarboxylic acid, or basic metal oxides such as zinc, lead or antimony oxide. The reaction is typically run at about 250° C. to 300° C. under vacuum at a progressively reduced pressure of about 1 to 100 mm Hg. The reaction is run in the absence of solvent and typically yields lower viscosity grades of polycarbonate.

Polycarbonate can also be prepared in a homogeneous solution through a process in which a carbonate precursor, such as phosgene, is contacted with a solution containing an aromatic dihydroxy compound, a chlorinated hydrocarbon solvent and a substance, such as pyridine, dimethyl aniline or CaOH, which acts as both acid acceptor and condensation catalyst. Washing with acidified water removes the pyridine and its hydrochloride, and precipitation and repulping with an antisolvent such as heptane followed by filtration and distillation removes oligomers and unreacted monomer.

Examples of some dihydroxy compounds suitable for the preparation of polycarbonate include variously bridged, substituted or unsubstituted aromatic dihydroxy compounds (or mixtures thereof) represented by the formula

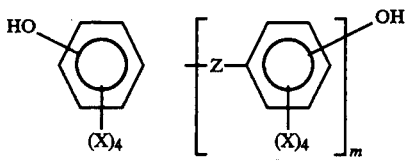

wherein:
(I) Z is (A) a divalent radical, of which all or different portions can be (i) linear, branched, cyclic or bicyclic, (ii) aliphatic or aromatic, and/or (iii) saturated or unsaturated, said divalent radical being composed of 1-35 carbon atoms together with up to five oxygen, nitrogen, sulfur, phosphorous and/or halogen (such as fluorine, chlorine and/or bromine) atoms; or (B) S, $S_2$, SO, $SO_2$, O or CO; or (C) a single bond;

(II) each X is independently hydrogen, a halogen (such as flourine, chlorine and/or bromine), a $C_1$–$C_{12}$, preferably $C_1$–$C_8$, linear or cyclic alkyl, aryl, alkaryl, aralkyl, alkoxy or aryloxy radical, such as methyl, ethyl, isopropyl, cyclopentyl, cyclohexyl, methoxy, ethoxy, benzyl, tolyl, xylyl, phenoxy and/or xylynoxy; or a nitro or nitrile radical; and (III) m is 0 or 1.

For example, the bridging radical represented by Z in the above formula can be a $C_2$–$C_{30}$ alkyl, cycloalkyl, alkylidene or cycloalkyidene radical, or two or more thereof connected by an aromatic or ether linkage, or can be a carbon atom to which is bonded one or more groups such as $CH_3$, $C_2H_5$, $C_3H_7$, n—$C_3H_7$, i—$C_3H_7$, cyclohexyl, bicyclo[2.2.1]heptyl, benzyl, $CF_2$, $CF_3$ $CCl_3$, $CF_2Cl$, CN, $(CH_2)_2COOCH_3$, or $PO(0CH_3)_2$.

Representative examples of dihydroxy compounds of particular interest are the bis(hydroxyphenyl)alkanes, the bis(hydroxyphenyl)cycloalkanes, the dihydroxydiphenyls and the bis(hydroxyphenyl)sulfones, and in particular are 2,2-bis(4-hydroxyphenyl)propane ("Bisphenol-A" or "Bis-A"); 2,2-bis(3,5-dihalo-4-hydroxyphenyl)propane ("Tetrahalo Bisphenol-A") where the halogen can be fluorine, chlorine, bromine or iodine, for example 2,2-bis(3,5-dibromo-4-hydroxyphenyl)propane ("Tetrabromo Bisphenol-A" or "TBBA"); 2,2-bis(3,5-dialkyl-4-hydroxyphenyl)propane ("Tetraalkyl Bisphenol-A") where the alkyl can be methyl or ethyl, for example 2,2-bis(3,5-dimethyl-4-hydroxyphenyl)propane ("Tetramethyl Bisphenol-A"); 1,1-bis(4-hydroxyphenyl)-1-phenyl ethane ("Bisphenol-AP" or "Bis-AP"); Bishydroxy phenyl fluorene; and 1,1-bis(4-hydroxyphenyl)cyclohexane.

Using a process such as is generally described above, a polycarbonate product can be obtained having a weight average molecular weight, as determined by light scattering or gel permeation chromatography, of 8,000 to 200,000 and preferably 15,000 to 40,000, and/or a melt flow value of about 3 to 150, preferably about 10 to 80 (as determined by ASTM Designation D 1238-89, Condition 300/1.2), although values outside these ranges are permitted as well. Molecular weight can be controlled by addition to the reaction mixture of a chain terminator which may be selected from monofunctional substances such as phenols, alcohols, amines, imides, carbonic acid chlorides, sulfonic acid chlorides, benzyltriethyl ammonium chloride, or phenylchlorocarbonates. A chain terminator may be added to the reaction mixture before or after a dihydroxy compound is contacted with a carbonate precursor, and is typically used in an amount of about 0.01 to 0.1 moles per mole of dihydroxy compound.

A branched rather than linear polycarbonate molecule can be obtained by adding to the reaction mixture a tri- or polyfunctional monomer such as a tri- or tetrafunctional phenol or carboxylic acid (or a derivative such as an acyl halide or anhydride), a bisphenol containing carboxylic acid side groups, or a nitrogen-containing compound such as cyanuric chloride, or compounds containing a mixture of such groups. Preferred branching agents are trimellitic acid, pyromellitic dianhydride or trisphenoxy ethane.

The preferred process of this invention is that in which an aromatic polycarbonate is prepared. An aromatic polycarbonate is defined herein with reference to the oxygen atoms, of the one or more dihydroxy compounds present in the polycarbonate chain, which are bonded to a carbonyl carbon of the carbonate precursor. In an aromatic polycarbonate, all such oxygen atoms are bridged by a dihydroxy compound residue some portion of which is an aromatic ring.

Also included within the term "polycarbonate", as used herein, are various copolycarbonates, certain of which can be prepared by incorporating one or more different dihydroxy compounds into the reaction mixture. This can be accomplished by charging the different dihydroxy compounds to the reaction mixture either simultaneously or sequentially. If the dihydroxy compounds are added sequentially or added together but have different reactivities toward the carbonate precursor, a segmented or block copolycarbonate will typically result. Different dihydroxy compounds with the same reactivity typically yield a random copolycarbonate when reacted together. Alternatively, if oligocarbonates are formed separately from one or more different dihydroxy compounds, the oligocarbonates can then be coupled in a condensation reaction to yield a segmented or block copolycarbonate.

When a dicarboxylic acid such terephthalic acid or isophthalic acid (or an ester-forming derivative thereof) or a hydroxycarboxylic acid is used in the reaction mixture, or to form an oligomeric prepolymer, instead of one of the "different" dihydroxy compounds mentioned above, a poly(ester/carbonate) is obtained. A poly(ester/carbonate) may have, for example, about 25 to 90, preferably about 35 to 80, mole percent ester bonds. A poly(ester/carbonate)s is discussed in greater detail in Swart, U.S. Pat. No. 4,105,533, which is incorporated herein. In a preferred embodiment, the compositions of this invention exclude a poly(ester/carbonate).

Copolycarbonates can also be prepared, for example, by reaction of one or more dihydroxy compounds with a carbonate precursor in the presence of a chlorine- or amino-terminated polysiloxane, with a hydroxy-terminated poly(phenylene oxide) or poly(methyl methacrylate), or with phosphonyl dichloride or an aromatic ester of a phosphonic acid. Siloxane/carbonate block copolymers are discussed in greater detail in Paul, U.S. Pat. No. 4,596,970, which is incorporated herein.

The methods generally described above for preparing carbonate polymers suitable for use in the practice of this invention are well known; for example, several methods are discussed in detail in Schnell, U.S. Pat. No. 3,028,365; Glass, U.S. Pat. No. 4,529,791; and Grigo, U.S. Pat. No. 4,677,162, each of which is incorporated as a part hereof.

Component (b) in the compositions of this invention is a substantially linear ethylene polymer, or a mixture of more than one thereof. These substantially linear ethylene polymers are known, and they and their method of preparation are fully described in U.S. Pat. No. 5,272,236 and U.S. Pat. No. 5,278,272, both of which are incorporated herein by reference. As here used, "substantially linear" means that the polymer backbone is substituted with about 0.01 long-chain branches/1000 carbons to about 3 long-chain branches/1000 carbons, preferably from about 0.01 long-chain branches/1000 carbons to about 1 long-chain branch/1000 carbons, more preferably from about 0.05 long-chain branches/1000 carbons to about 1 long-chain branch/1000 carbons. Long-chain branching is here defined as a chain length of at least about 6 carbon atoms, above which the length cannot be distinquished using $^{13}C$ nuclear magnetic resonance spectroscopy, yet the long-chain branch can be about the same length as the length of the polymer backbone.

These substantially linear ethylene polymers are prepared by using constrained geometry catalysts, and are characterized by a narrow molecular weight distribution and, if an interpolymer, by a narrow comonomer distribution. As here used, "interpolymer" means a polymer of two or more comonomers, for example a copolymer or terpolymer, such as might be prepared by polymerizing ethylene with at least one other comonomer. Other basic characteristics of these substantially linear ethylene polymers include a low residuals content (i.e. a low concentration therein of the catalyst used to prepare the polymer, unreacted comonomers and low molecular weight oligomers made during the course of the polymerization), and a controlled molecular architecture which provides good processability even though the molecular weight distribution is narrow relative to conventional olefin polymers.

While the substantially linear ethylene polymers used in the practice of this invention include substantially linear ethylene homopolymers, preferably the substantially linear ethylene polymers comprise between about 50 to 95 weight percent ethylene and about 5 to 50, and preferably 10 to 25, weight percent of at least one alpha-olefin comonomer. The comonomer content is measured using infrared spectroscopy according to ASTM D-2238, Method B. Typically, the substantially linear ethylene polymers are copolymers of ethylene and one or more alpha-olefins of 3 to about 20 carbon atoms (e.g. propylene, 1-butene, 1-hexene, 4-methyl-1-pentene, 1-heptene, 1-octene and/or styrene), preferably alpha-olefins of 3 to about 10 carbon atoms, and more preferably these polymers are a copolymer of ethylene and 1-octene.

The density of these substantially linear ethylene polymers is typically between about 0.850 to about 0.935 grams per cubic centimeter (g/cm$^3$), preferably about 0.860 to about 0.900 g/cm$^3$. Their melt flow ratio, measured as $I_{10}/I_2$, is greater than or equal to 5.63, is preferably from about 6.5 to 15, and is more preferably from about 7 to 10. $I_2$ is measured according to ASTM Designation D 1238, Condition 190/2.16, and $I_{10}$ according to Condition 190/10.0. Their molecular weight distribution [weight average molecular weight divided by number average molecular weight ($M_w/M_n$)], measured by gel permeation chromatography (GPC), is defined by the equation: $M_w/M_n \leq (I_{10}/I_2) - 4.63$, and is preferably between about 1.5 and 2.5. For substantially linear ethylene polymers, the $I_{10}/I_2$ ratio indicates the degree of long-chain branching, i.e. the larger the $I_{10}/I_2$ ratio, the more long-chain branching in the polymer.

According to Ramamurthy in 30(2) *Journal of Rheology* 337–357 (1986), polymer surface melt fracture may occur above a certain critical flow rate, which may result in irregularities ranging from loss of specular gloss to the more severe form of "sharkskin". As used herein, the onset of surface melt fracture is characterized as the beginning of loss of extrudate gloss at which the surface roughness of extrudate can only be detected by 40× magnification. The substantially linear ethylene polymers hereof are further characterized by a critical shear rate at the onset of surface melt fracture which is at least 50 percent greater than the critical shear rate at the onset of surface melt fracture of a linear olefin polymer having about the same $I_2$ and $M_w/M_n$.

The unique characteristic of these homogeneously branched, substantially linear ethylene polymers is a highly unexpected flow property wherein the $I_{10}/I_2$ value of the polymer is essentially independent of the polydispersity index (i.e. $M_w/M_n$) of the polymer. This is contrasted with conventional linear homogeneously branched and linear heterogeneously branched polyethylene resins having rheological properties such that to increase the $I_{10}/I_2$ value, the polydispersity index must also be increased.

The preferred $I_2$ melt index for these substantially linear ethylene polymers is from about 0.01 g/10 min to about 100 g/10 min, and more preferably about 0.1 to 10 g/10 min. Typically, these polymers are homogeneously branched and do not have any measurable high density fraction, i.e. short chain branching distribution as measured by Temperature Rising Elution Fractionation which is described in U.S. Pat. No. 5,089,321 (incorporated herein in its entirety). Stated in another manner, these polymers do not contain any polymer fraction that has a degree of branching less than or equal to 2 methyls/1000 carbons. These substantially linear ethylene polymers are also characterized by a single differential scanning calorimetry (DSC) melting peak.

Component (c) in the compositions of this invention is a styrenic copolymer prepared from one or more styrenic monomers and one or more ethylenically unsaturated monomers copolymerizable with a styrenic monomer. The styrenic copolymer may be a random, alternate, block or grafted copolymer, and a mixture of more than one styrenic copolymer may be used as well.

Styrenic monomers of particular interest for use in preparation of a styrenic copolymer, in addition to styrene itself, include one or more of the substituted styrenes or vinyl aromatic compounds described by the following formula [it being understood that a reference to "styrene" as a comonomer in component (c) is to be read as a reference to any of the styrenic or vinyl aromatic monomers described herein or any others of like kind]:

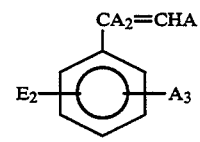

wherein each A is independently hydrogen, a $C_1$-$C_6$ alkyl radical or a halogen atom such as chlorine or bromine; and each E is independently hydrogen, a $C_1$–$C_{10}$ alkyl, cycloalkyl, alkenyl, cycloalkenyl, aryl, alkaryl, aralkyl or alkoxy radical, a halogen atom such as chlorine or bromine, or two E's may be joined to form a naphthalene structure. Representative examples of suitable styrenic monomers, in addition to styrene itself, include one or more of the following: ring-substituted alkyl styrenes, e.g. vinyl toluene, o-ethylstyrene, p-ethylstyrene, ar-(t-butyl)styrene, 2,4-dimethylstyrene; ring-substituted halostyrenes, e.g., o-chlorostyrene, p-chlorostyrene, o-bromostyrene, 2,4-dichlorostyrene; ring-alkyl, ring-halo-substituted styrenes, e.g. 2-chloro-4-methylstyrene and 2,6-dichloro-4-methylstyrene; ar-methoxy styrene, vinyl naphthalene or anthracene, p-diisopropenylbenzene, divinylbenzene, vinylxylene, alpha-methylstyrene, and alpha-methylvinyltoluene.

Ethylenically unsaturated monomers of particular interest for copolymerization with a styrenic monomer include one or more of those described by the formula: D—CH=C(D)—(CH$_2$)n—G, wherein each D independently represents a substituent selected from the group consisting of hydrogen, halogen (such as fluorine, chlorine or bromine), $C_1$–$C_6$ alkyl or alkoxy, or taken together represent an anhydride linkage; G is hydrogen, vinyl, $C_1$–$C_{12}$ alkyl, cycloalkyl, alkenyl, cycloalkenyl, alkaryl, arylalkyl, alkoxy, aryloxy, ketoxy, halogen (such as fluorine, chlorine or bromine), cyano or pyridyl; and n is 0–9.

Representative examples of ethylenically unsaturated monomers copolymerizable with a styrenic monomer are those which bear a polar or electronegative group and include one or more of the following: a vinyl nitrile compound such as acrylonitrile, methacrylonitrile, ethacrylonitrile, alphachloroacrylonitrile and fumaronitrile; a diene such as butadiene, isoprene, isobutylene, piperylene, cyclopentadiene, natural rubber, chlorinated rubber, 1,2-hexadiene, methyl-1,3-pentadiene, 2,3-dimethyl-1,3-1,3-pentadiene, 2-methyl-3-ethyl-1,3-butadiene, 2-ethyl-1,3-pentadiene, 1,3- and 2,4-hexadienes, chloro- and bromo-substituted butadienes such as dichlorobutadiene, bromobutadiene, chloroprene and dibromobutadiene, and butadiene/isoprene and isoprene/isobutylene copolymers; 1,3-divinylbenzene; 2-phenyl propene; a $C_2$–$C_{10}$ alkylene compound including halo-substituted derivatives thereof such as vinyl or vinylidine chloride; the alpha,beta-ethylenically unsaturated carboxylic acids, such as acrylic acid, methacrylic acid, maleic acid, succinic acid, acotinic acid and itaconic acid, and their anhydrides and $C_1$–$C_{10}$ alkyl, aminoalkyl and hydroxyalkyl esters and amides, such as alkyl acrylates and methacrylates such as methyl acrylate, propyl acrylate, butyl acrylate, octyl acrylate, methyl alpha-chloro acrylate, methyl, ethyl or isobutyl methacrylate, hydroxyethyl and hydroxypropyl acrylates, aminoethyl acrylate and glycidyl methacrylate; maleic anhydride; an alkyl or aryl maleate or fumarate such as diethylchloromaleate or diethyl fumarate; an aliphatic or aromatic maleimide, such as N-phenyl maleimide, including the reaction product of a $C_1$–$C_{10}$ alkyl or $C_6$–$C_{14}$ aryl primary amine and maleic anhydride; methacrylamide, acrylamide or N.N-diethyl acrylamide; vinyl ketones such as methyl vinyl ketone or methyl isopropenyl ketone; vinyl or allyl acetate and higher alkyl or aryl vinyl or allyl esters; vinyl alcohols; vinyl ethers such as $C_1$–$C_6$ alkyl vinyl ether and their alkyl-substituted halo derivatives; vinyl pyridines; vinyl furans; vinyl aldehydes such as acrolein or crotonaldehyde; vinyl carbazole; vinyl pyrrolidone; N-vinylphthalimide; and an oxazoline compound includes those of the general formula

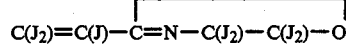

where each J is independently hydrogen, halogen, a $C_1$–$C_{10}$ alkyl radical or a $C_6$–$C_{14}$ aryl radical; and the like.

Examples of preferred styrenic copolymers are vinyl aromatic/vinyl nitrile copolymers such as styrene/acrylonitrile copolymer ("SAN"), styrene/maleic anhydride copolymer, styrene/glycidyl methacrylate copolymer, aryl maleimimde/vinyl nitrile/diene/styrenic copolymer, strene/alkyl methacrylate copolymer, styrene/alkyl methacrylate/glydicyl methacrylate copolymer, styrene/butyl acrylate copolymer, methyl methacryalte/acrylonitrile/butadiene/styrene copolymer, or a rubber-modified vinyl aromatic/vinyl nitrile copolymer such as an ABS, AES or ASA copolymer.

ABS (acrylonitrile/butadiene/styrene copolymer) is an elastomeric-thermoplastic composite in which vinyl aromatic/vinyl nitrile copolymer is grafted onto a polybutadiene substrate latex. The polybutadiene forms particles of rubber—the rubber modifier or elastomeric component—which are dispersed as a discrete phase in a thermoplastic matrix formed by random vinyl aromatic/vinyl nitrile copolymer. Typically, vinyl aromatic/vinyl nitrile copolymer is both occluded in and grafted to the particles of rubber. AES (acrylonitrile/EPDM/styrene) copolymer is a styrenic copolymer which is obtained when vinyl aromatic/vinyl nitrile copolymer is rubber-modified by grafting vinyl aromatic/vinyl nitrile copolymer to a substrate made up of an EPDM (ethylene/propylene/non-conjugated diene) rubber. AES copolymers are discussed in greater detail in Henton, U.S. Pat. No. 4,766,175, which is incorporated as a part hereof. A vinyl aromatic/vinyl nitrile copolymer can also be crosslinked to an alkyl acrylate elastomer to form a rubber-modified styrenic copolymer, as in the case of an ASA (acrylonitrile/styrene/acrylate) copolymer, which is discussed in greater detail in Yu, U.S. Pat. No. 3,944,631, which is also incorporated as a part hereof.

The monomers copolymerized to form a styrenic copolymer may each be used in virtually any amount from 1 to 99 weight percent, but a styrenic copolymer will typically contain at least about 15 percent by weight, preferably at least about 35 percent by weight, and more preferably at least about 60 percent by weight of a styrenic monomer, with the balance being made up of one or more copolymerizable ethylenically unsaturated monomers. When rubber modified, a styrenic copolymer will typically contain at least about 15 percent by weight, preferably at least about 25 percent by weight, and more preferably at least about 35 percent by weight of a styrenic monomer, with the balance being made up of one or more copolymerizable ethylenically unsaturated monomers.

The elastomeric phase of a rubber-modified styrenic copolymer as employed in the compositions of this invention is up to about 45 percent, preferably about 5 to 40 percent, more preferably about 10 to 35 percent, by weight of the copolymer. The preferred elastomeric phase exhibits a glass transition temperature ($T_g$) generally less than 0° C., more preferably less than −30° C., and most preferably from about −110° C. to about −50° C. as determined by ASTM D-746-52T or −56T. The elastomeric phase advantageously has an average particle size of about 10 microns or less, preferably in the range from about 0.05 to about 5 microns, and more preferably in the range from about 0.1 to about 0.3 microns, and typically exhibits an intrinsic viscosity, as determined at 25° C. in toluene, of about 0.1 to about 5. In addition to the aforementioned monomeric components, it should be understood that the elastomeric phase may also contain relatively small amounts, usually less than about 2 weight percent based on the rubber, of a crosslinking agent such a divinylbenzene, diallylmaleate, ethylene glycol dimethacrylate and the like provided that such crosslinking does not eliminate the desired elastomeric character of rubber.

The molecular weight of a styrenic copolymer is not particularly critical so long as its melt flow viscosity is such that it can be melt blended with the other components of the compositions of this invention. Preferably, however, the melt flow viscosity of the styrenic copolymer as determined by ASTM D-1238-65T(1) is from about 0.01 to about 10, more preferably from about 0.1 to about about 5, and most preferably from about 2 to about 3, deciliters per minute. When the ethylenically unsaturated monomer possesses a polar group, the polar group typically has a group moment of about 1.4 to 4.4 Debye units, although values outside such ranges are permitted as well.

A styrenic copolymer may be made by an emulsion, suspension or mass (bulk) method. For example, when ABS is made by emulsion polymerization, a rubber substrate latex is produced in an aqueous emulsion by a polymerization, which can be initiated by organic peroxides, persulfates or redox systems, of 1,3-butadiene alone or in combination with other vinyl monomers such as styrene or methacrylonitrile. The rubber latex substrate is subjected to further aqueous emulsion polymerization, using similar initiators or azo compounds, with styrene and acrylonitrile monomers, and optionally other vinyl monomers, wherein the concentration of styrene is usually about 1.5 to 3.5 times that of acrylonitrile. SAN is formed, some of which is grafted to the rubber latex substrate, and some of which as free copolymer forms a rigid matrix. The latex containing both the grafted rubber and the free SAN is then mixed with a coagulant solution, heated and agitated to produce discrete particles of ABS resin. The slurry containing those particles is dewatered in a centrifuge, and the resin is dried.

When ABS is made by suspension polymerization, a pre-formed elastomeric (rubber) component, usually a polybutadiene or a butadiene/styrene copolymer, is dissolved in a mixture of styrene and acrylonitrile, and, optionally, other vinyl monomers. The rubber component, monomers and initiator are charged to the reaction vessel and polymerization ensues at about 60°–140° C. until a conversion rate of about 15 percent to about 30 percent is reached, resulting in the production of a prepolymer. Phase inversion occurs, and the rubber precipitates from solution and becomes the discontinuous phase dispersed as particles ranging from 0.1 to 5 microns in size. The prepolymer is then placed in a suspension reactor in an aqueous solution containing a suspending agent, initiator and chain transfer agent. Agitation of the solution completes the polymerization. The process is finished by dewatering the slurry in a centrifuge, and moisture content is further reduced by flash drying.

When ABS is made by bulk or mass polymerization, it is formed by dissolving an elastomeric (rubber) component in the monomer mix, which contains styrene and acrylonitrile (and, optionally, other vinyl monomers), an initiator and, frequently, a chain transfer agent such as a mercaptan or a terpinolene. The reaction can, however, be thermally initiated. The styrene and acrylonitrile monomers polymerize at about 60°–100° C., some grafting to the rubber component, but most forming a monomer-polymer solution. As the relative volume of the monomer-SAN polymer phase increases, discrete rubber particles become dispersed in the matrix resulting from the monomer-SAN polymer phase. The rubber particles are stabilized by being grafted to SAN polymers at the interface between the particles and the SAN polymer matrix. Additional stabilization is furnished when monomer becomes occluded, and polymerizes, within the rubber particles. Because polymerization occurs completely within a monomer/polymer medium, viscosity increases as conversion increases. To allow continued agitation of the reaction mixture despite such increasing viscosity, diluents such as methyl ethyl ketone and ethylbenzene are added to the reactor. Upon the completion of polymerization, the melt is devolatilized using equipment such as a devolatilizing extruder or a flash evaporator, and vacuum is applied to remove unreacted monomers and diluents.

Methods for making ABS or other styrenic copolymers, as described above, are discussed in greater detail in Childers, U.S. Pat. No. 2,820,773, Calvert, U.S. Pat. No. 3,238,275, Carrock, U.S. Pat. No. 3,515,692, Ackerman, U.S. Pat. No. 4,151,128, Kruse, U.S. Pat. No. 4,187,260, Simon, U.S. Pat. No. 4,252,911 Weber, U.S. Pat. No. 4,526,926, Rudd, U.S. Pat. No. 4,163,762 and Weber, U.S. Pat. No. 4,624,986, each being hereby incorporated as a part hereof.

Component (d) in the compositions of this invention is a supplemental impact modifier, including, for example, elastomers such as a block copolymer, a core-shell grafted copolymer or mixtures thereof. A block copolymer useful as a supplemental impact modifier herein can be either linear, branched, radial or teleblock, and can be either a di-block ("A-B") copolymer, tri-block ("A-B-A") copolymer, or radial teleblock copolymer with or without tapered sections, i.e. portions of the polymer where the monomers alternate or are in random order close to the point of transition between the A and B blocks. The A portion is frequently prepared by polymerizing one or more vinyl aromatic hydrocarbon monomers, and has a weight average molecular weight of about 4,000 to about 115,000, preferably about 8,000 to about 60,000. The B portion of the block copolymer typically results from polymerizing a diene and has a weight average molecular weight of about 20,000 to about 450,000, preferably about 50,000 to about 300,000. In an A-B di-block copolymer, each block, A or B, can vary from 10–90% of the total weight of the copolymer. In an A-B-A tri-block copolymer, the A end groups typically constitute about 2 wt % to about 55 wt % of the whole block copolymer, and preferably are between 5 wt % and 45 wt % of the whole block copolymer.

The A block of the block copolymer has properties characteristic of thermoplastic substances in that it has the stability necessary for processing at elevated temperatures and yet possesses good strength below the temperature at which it softens. The A block of a vinyl aromatic block copolymer is polymerized predominantly from the various styrenic monomers described above with respect to a styrenic copolymer, but minor proportions of other copolymerizable ethylenically unsaturated monomers (also described above in the same context) may be used as well.

The B block is formed predominantly from substituted or unsubstituted $C_3$-$C_{10}$ dienes, particularly conjugated dienes such as butadiene or isoprene. Other diene or copolymerizable ethylenically unsaturated monomers (described above in connection with a styrenic copolymer) may be used in the formation of the B block provided that they are present at a level low enough to not alter the fundamental olefinic character of the B block. The B block will be characterized by elastomeric properties which allow it to absorb and dissipate an applied stress and then regain its shape.

To reduce oxidative and thermal instability, the block copolymers used herein can also desirably be hydrogenated to reduce the degree of unsaturation on the polymer chain and on the pendant aromatic rings. The block copolymer may be selectively hydrogenated by hydrogenating only the elastomeric block B. Typical hydrogenation catalysts utilized are Raney nickel, molybdenum sulfide, finely divided palladium and platinum oxide. The hydrogenation reaction is typically run at 75°–450° F. and at 100–1,000 psig for 10–25 hours.

The most preferred vinyl aromatic block copolymers are vinyl aromatic/conjugated diene block copolymers formed from styrene and butadiene or styrene and isoprene. When the styrene/butadiene copolymers are hydrogenated, they are frequently represented as styrene/(ethylene/butylene) copolymer in the di-block form, or as styrene/(ethylene/butylene)/styrene copolymer in the tri-block form. When the styrene/isoprene copolymers are hydrogenated, they are frequently represented as styrene/(ethylene/propylene) copolymer in the di-block form, or as styrene/(ethylene/propylene)/styrene copolymer in the tri-block form. Vinyl aromatic/diene block copolymers such as are described above are discussed in greater detail in Holden, U.S. Pat. No. 3,265,766, Haefele, U.S. Pat. No. 3,333,024, Wald, U.S. Pat. No. 3,595,942, and Witsiepe, U.S. Pat. No. 3,651,014, each of which is incorporated herein, and many are available commercially as the various Kraton ™ elastomers from Shell Chemical Company.

Core-shell grafted copolymer elastomers suitable for use herein as a supplemental impact modifier are those which are based on either a diene rubber, an alkyl acrylate rubber, or on mixtures thereof, and have an elastomeric, or rubber, phase which is greater than about 45% or more of the copolymer by weight. A core-shell grafted copolymer based on a diene rubber contains a substrate latex, or core, which is made by polymerizing a diene, preferably a conjugated diene, or by copolymerizing a diene with a mono-olefin or a polar vinyl compound, such as styrene, acrylonitrile, or an alkyl ester of an unsaturated carboxylic acid such as methyl methacrylate. The substrate latex is typically made up of about 40–85% diene, preferably a conjugated diene, and about 15–60% of the mono-olefin or polar vinyl compound. The elastomeric core phase should have a glass transition temperature ("$T_g$") of less than about 10° C., and preferably less than about −20° C. A mixture of ethylenically unsaturated monomers is then graft polymerized to the substrate latex. A variety of monomers may be used for this grafting purpose, of which the following are exemplary: vinyl compounds such as vinyl toluene or vinyl chloride; vinyl aromatics such as styrene, alpha-methyl styrene or halogenated styrene; acrylonitrile, methacrylonitrile or alpha-halogenated acrylonitrile; a $C_1$-$C_8$ alkyl acrylate such as ethyl acrylate or hexyl acrylate; a $C_1$-$C_8$ alkyl methacrylate such as methyl methacrylate or hexyl methacrylate; glycidyl methacrylate; acrylic or methacrylic acid; and the like or a mixture of two or more thereof. The preferred grafting monomers include one or more of styrene, acrylonitrile and methyl methacrylate.

The grafting monomers may be added to the reaction mixture simultaneously or in sequence, and, when added in sequence, layers, shells or wart-like appendages can be built up around the substrate latex, or core. The monomers can be added in various ratios to each other although, when just two are used, they are frequently utilized in equal amounts. A typical weight ratio for methyl methacrylate/butadiene/styrene copolymer ("MBS" rubber) is about 60–80 parts by weight substrate latex, about 10–20 parts by weight of each of the first and second monomer shells. A preferred formulation for an MBS rubber is one having a core built up from about 71 parts of butadiene, about 3 parts of styrene, about 4 parts of methyl methacrylate and about 1 part of divinyl benzene; a second phase of about 11 parts of styrene; and a shell phase of about 11 parts of methyl methacrylate and about 0.1 part of 1,3-butylene glycol dimethacrylate, where the parts are by weight of the total composition. A diene-based, core-shell graft copolymer elastomer and methods for making same, as described above, are discussed in greater detail in Saito, U.S. Pat. No. 3,287,443, Curfman, U.S. Pat. No. 3,657,391, and Fromuth, U.S. Pat. No. 4,180,494, each of which is incorporated herein.

A core-shell grafted copolymer based on an alkyl acrylate rubber has a first phase forming an elastomeric core and a second phase forming a rigid thermoplastic phase about said elastomeric core. The elastomeric core is formed by emulsion or suspension polymerization of monomers which consist of at least about 50 weight percent alkyl and/or aralkyl acrylates having up to fifteen carbon atoms, and, although longer chains may be used, the alkyls are preferably $C_2$-$C_6$, most preferably butyl acrylate. The elastomeric core phase should have a $T_g$ of less than about 10° C., and preferably less than about −20° C. About 0.1 to 5 weight percent of (i) a cross-linking monomer which has a plurality of addition polymerizable reactive groups all of which polymerize at substantially the same rate, such as butylene diacrylate, and (ii) a graft-linking monomer which has a plurality of addition polymerizable reactive groups some of which polymerize at substantially different rates than others, such as diallyl maleate, is typically polymerized as part of the elastomeric core.

The rigid thermoplastic phase of the acrylate rubber is formed on the surface of the elastomeric core using suspension or emulsion polymerization techniques. The monomers necessary to create this phase together with necessary initiators are added directly to the reaction mixture in which the elastomeric core is formed, and polymerization proceeds until the supply of monomers is substantially exhausted. Ethylenically unsaturated monomers such as glycidyl methacrylate, or an alkyl ester of an unsaturated carboxylic acid, for example a $C_1$-$C_8$ alkyl acrylate like methyl acrylate, hydroxy ethyl acrylate or hexyl acrylate, or a $C_1$-$C_8$ alkyl methacrylate such as methyl methacrylate or hexyl methacrylate, or mixtures of any of the foregoing, are some of the vinyl monomers which can be used for this purpose. Either thermal or redox initiator systems can be used. Because of the presence of the graft linking agents on the surface of the elastomeric core, a portion of the chains which make up the rigid thermoplastic phase are chemically bonded to the elastomeric core. It is preferred that there be at least about 20% bonding of the rigid thermoplastic phase to the elastomeric core.

A preferred acrylate rubber is made up of more than about 45% to about 95% by weight of an elastomeric core and about 60% to about 5% of a rigid thermoplastic phase. The elastomeric core can be polymerized from about 75% to about 99.8% by weight $C_1$–$C_6$ acrylate, preferably n-butyl acrylate. The rigid thermoplastic phase can be polymerized from at least 50% by weight of $C_1$–$C_8$ alkyl methacrylate, preferably methyl methacrylate. Acrylate rubbers and methods for making same, as described above, are discussed in greater detail in Owens, U.S. Pat. No. 3,808,180 and Witman, U.S. Pat. No. 4,299,928, each of which is incorporated herein. Various diene-based and acrylate-based core-shell grafted copolymers are available commercially from Rohm & Haas as the Acryloid ™ or Paraloid ™ elastomers.

Other supplemental impact modifiers or elastomers useful in the compositions of this invention are those based generally on a long-chain, hydrocarbon backbone ("olefinic elastomers"), which may be prepared predominantly from various mono- or dialkenyl monomers and may be grafted with one or more styrenic monomers. Representative examples of a few olefinic elastomers which illustrate the variation in the known substances which would suffice for such purpose are as follows: butyl rubber; chlorinated polyethylene rubber; chlorosulfonated polyethylene rubber; an olefin polymer or copolymer such as ethylene/propylene copolymer, ethylene/styrene copolymer or ethylene/propylene/diene copolymer, which may be grafted with one or more styrenic monomers; neoprene rubber; nitrile rubber; polybutadiene and polyisoprene.

An example of a preferred olefinic elastomer is a copolymer which has a a glass transition temperature ($T_g$) less than 0° C. prepared from (i) at least one olefin monomer such as ethylene, propylene, isopropylene, butylene or isobutylene, or at least one conjugated diene such as butadiene, and the like, or mixtures thereof; and (ii) an ethylenically unsaturated monomer carrying an epoxide group (for example, glycidyl methacrylate), and, optionally, (iii) an ethylenically unsaturated monomer which does not carry an epoxide group (for example, vinyl acetate). $T_g$ is the temperature or temperature range at which a polymeric material shows an abrupt change in its physical properties, including, for example, mechanical strength. $T_g$ can be determined by differential scanning calorimetry.

Component (e) in the compositions of this invention is a molding polymer selected from (i) polyester, (ii) other olefin-based polymers, and mixtures thereof.

Component (e)(i), a polyester, as utilized in the compositions of this invention may be made by the self-esterification of hydroxycarboxylic acids, or by direct esterification, which involves the step-growth reaction of a diol with a dicarboxylic acid with the resulting elimination of water, giving a polyester with an —[—AABB—]— repeating unit. The reaction may be run in bulk or in solution using an inert high boiling solvent such as xylene or chlorobenzene with azeotropic removal of water.

Alternatively, but in like manner, ester-forming derivatives of a dicarboxylic acid can be heated with a diol to obtain polyesters in an ester interchange reaction. Suitable acid derivatives for such purpose are alkyl esters, halides, salts or anhydrides of the acid. Preparation of polyarylates, from a bisphenol and an aromatic diacide, can be conducted in an interfacial system which is essentially the same as that used for the preparation of polycarbonate.

The molecular weight of polyester can be increased by adding a chain coupling agent, such as diphenyl carbonate, to the melt reaction mixture just prior its completion. Or, to achieve higher weight by solid state polymerization, polyester product of intermediate weight can be heated in a vacuum or stream of inert gas, first to a temperature where it crystallizes and then to a temperature close to its melting point.

Polyesters can also be produced by a ring-opening reaction of cyclic esters or $C_4$–$C_7$ lactones, for which organic tertiary amine bases phosphines and alkali and alkaline earth metals, hydrides and alkoxides can be used as initiators.

Whether a polyester is crystalline or amorphous is typically a function of the symmetry of the starting materials from which it is made. When one or more hydrogens on the diol and/or the diacid (or ester-forming derivative) which are reacted to form a polyester are replaced by larger radicals such as alkyl or halogen, the intermolecular spacing of the resulting molecules may be disrupted if the presence of the substituent creates asymmetric or irregularly shaped molecules. The component containing the substituent may also be combined into the polyester molecule in random orientation, resulting in structural irregularity in the polymer chain. Factors which can influence crystallization of ring-containing polyesters are the directionality of the ester groups, the stereochemistry of the rings and variations in symmetry where the rings are bridged. A crystalline material may be identified by the endotherm it displays on a differential scanning calorimeter. A suitable polyester for use in this invention is a crystalline polyester having a melting point of 254°–260° C.

Suitable reactants for making the polyester used in this invention, in addition to hydroxycarboxylic acids, are diols and dicarboxylic acids either or both of which can be aliphatic or aromatic. A polyester which is a poly(alkylene alkanedicarboxylate), a poly(alkylene arylenedicarboxylate), a poly(arylene alkanedicarboxylate), or a poly(arylene arylenedicarboxylate) is therefore appropriate for use herein. Alkyl portions of the polymer chain can be substituted with, for example, halogens, $C_1$–$C_8$ alkoxy groups or $C_1$–$C_8$ alkyl side chains and can contain divalent heteroatomic groups (such as —O—, —Si—, —S— or —$SO_2$—) in the paraffinic segment of the chain. The chain can also contain unsaturation and $C_6$–$C_{10}$ non-aromatic rings. Aromatic rings can contain substituents such as halogens, $C_1$–$C_8$ alkoxy or $C_1$–$C_8$ alkyl groups, and can be joined to the polymer backbone in any ring position and directly to the alcohol or acid functionality or to intervening atoms.

Typical aliphatic diols used in ester formation are the $C_2$–$C_{10}$ primary and secondary glycols, such as ethylene-, propylene-, and butylene glycol. Alkanedicarboxylic acids frequently used are oxalic acid, adipic acid and sebacic acid. Diols which contain rings can be, for example, a 1,4-cyclohexylenyl glycol or a 1,4-cyclohexane-dimethylene glycol, resorcinol, hydroquinone, 4,4'-thiodiphenol, bis-(4-hydroxyphenyl)sulfone, a dihydroxynaphthalene, a xylylene diol, or can be one of the many bisphenols such as 2,2-bis-(4-hydroxyphenyl)propane. Aromatic diacids include, for example, terephthalic acid, isophthalic acid, naphthalenedicarboxylic acid, diphenyletherdicarboxylic acid, diphenyldicarboxylic acid, diphenylsulfonedicarboxylic acid, diphenoxyethanedicarboxylic acid.

In addition to polyesters formed from one diol and one diacid only, the term "polyester" as used herein includes random, patterned or block copolyesters, for example those formed from two or more different diols and/or two or more different diacids, and/or from other divalent heteroatomic groups. Mixtures of such copolyesters, mixtures of polyesters derived from one diol and diacid only, and mixtures of members from both of such groups, are also all suitable for use in this invention, and are all included in the term "polyester". For example, use of cyclohexanedimethanol together with ethylene glycol in esterification with terephthalic acid forms a clear, amorphous copolyester of particular interest. Also contemplated are liquid crystalline polyesters derived from mixtures of 4-hydroxybenzoic acid and 2-hydroxy-6-naphthoic acid; or mixtures of terephthalic acid, 4-hydroxybenzoic acid and ethylene glycol; or mixtures of terephthalic acid, 4-hydroxybenzoic acid and 4,4'-dihydroxybiphenyl.

Aromatic polyesters, those prepared from an aromatic diacid, such as the poly(alkylene arylenedicarboxylates) polyethylene terephthalate and polybutylene terephthalate, or mixtures thereof, are particularly useful in this invention. A polyester suitable for use herein may have an intrinsic viscosity of about 0.4 to 1.04, although values outside this range are permitted as well.

Methods and materials useful for the production of polyesters, as described above, are discussed in greater detail in Whinfield, U.S. Pat. No. 2,465,319, Pengilly, U.S. Pat. No. 3,047,539, Schwarz, U.S. Pat. No. 3,374,402, Russell, U.S. Pat. No. 3,756,986 and East, U.S. Pat. No. 4,393,191, each of which is incorporated herein by reference.

Component (d)(ii) includes a variety of olefin-based polymers which are not part of the category of substantially linear ethylene polymers described above as component (b). These other olefin-based polymers include conventional homogeneously or heterogeneously branched linear ethylene polymers, any of which can be grafted or ungrafted. Examples of such polymers include high density polyethylene, low density polyethylene, linear low density polyethylene, ultra low density polyethylene, polypropylene, polyisobutylene, ethylene/acrylic acid copolymer, ethylene/vinyl acetate copolymer, ethylene/vinyl alcohol copolymer, ethylene/carbon monoxide copolymer (including those described in U.S. Pat. No. 4,916,208 and 4,929,673, each being incorporated herein), ethylene/propylene/carbon monoxide copolymer, ethylene/carbon monoxide/acrylic acid copolymer, polystyrene, poly(vinyl chloride), and the like and mixtures thereof. In the suspension process for preparing poly(vinyl chloride), vinyl chloride monomer can be copolymerized with other vinyl monomers, such as vinyl acetate, acrylonitrile, butadiene, butyl acrylate, maleic anhydride, an olefin or styrene, to produce a random, block or graft copolymer.

A variety of additives may be advantageously employed to promote flame retardance or ignition resistance in the compositions of this invention. Representative examples thereof include the oxides and halides of the metals of Groups IVA and VA of the periodic table such as the oxides and halides of antimony, bismuth, arsenic, tin and lead such as antimony oxide, antimony chloride, antimony oxychloride, stannic oxide, stannic chloride and arsenous oxide; the organic and inorganic compounds of phosphorous, nitrogen, boron and sulfur such as aromatic phosphates and phosphonates (including halogenated derivatives thereof), alkyl acid phosphates, tributoxyethyl phosphate, 1,3-dichloro-2-propanol phosphate, 3,9-tribromoneopentoxy-2,4,8,10-tetraoxa-3,9-diphosphaspiro(5.5)undecane-3,9-dioxide, phosphine oxides, ammonium phosphate, zinc borate, thiourea, urea, ammonium sulfamate, ammonium polyphosphoric acid and stannic sulfide; the oxides, halides and hydrates of other metals such as titanium, vanadium, chromium and magnesium such as titanium dioxide, chromic bromide, zirconium oxide, ammonium molybdate and stannous oxide hydrate; antimony compounds such as antimony phosphate, sodium antimonate, $KSb(OH)_6$, $NH_4SbF_6$ and $SbS_3$; antimonic esters of inorganic acids, cyclic alkyl antimonite esters and aryl antimonic acid compounds such as potassium antimony tartrate, the antimony salt of caproic acid, $Sb(OCH_2CH_3)$, $Sb[OCH(CH_3)CH_2CH_3]_3$, antimony polyethylene glycorate, pentaerythritol antimonite and triphenyl antimony; boric acid; alumina trihydrate; ammonium fluoroborate; molybdenum oxide; halogenated hydrocarbons such as hexabromocyclodecane; decabromomdiphenyl oxide; 1,2-bis(2,4,6-tribromophenoxy) ethane; halogenated carbonate oligomers such as those prepared from Tetrabromobisphenol-A; halogenated epoxy resins such as brominated glycidyl ethers; tetrabromo phthalic anhydride; fluorinated olefin polymers or copolymers such as poly(tetrafluoroethylene); octabromodiphenyl oxide; ammonium bromide; isopropyl di(4-amino benzoyl) isostearoyl titanate; and metal salts of aromatic sulfur compounds such as sulfates, bisulfates, sulfonates, sulfonamides and sulfimides; other alkali metal and alkaline earth metal salts of sulfur, phosphorus and nitrogen compounds; and others as set forth in Laughner, U.S. Pat. No. 4,786,686, which is incorporated herein; and the like, and mixtures thereof. A preferred flame retardant additive is antimony trioxide ($Sb_2O_3$). When a flame retardant is used in the compositions of this invention, it is typically used in an amount of up to about 15 percent, advantageously from about 0.01 to 15 percent, preferably from about 0.1 to 10 percent and more preferably from about 0.5 to 5 percent, by weight of the total composition.

A variety of additives may be advantageously used in the compositions of this invention for other purposes such as the following: antimicrobial agents such as organometallics, isothtazolones, organosulfurs and mercaptans; antioxidants such as phenolics, secondary amines, phophites and thioesters; antistatic agents such as quaternary ammonium compounds, amines, and ethoxylated, propoxylated or glycerol compounds; fillers and reinforcing agents such as talc, clay, mica, silica, quartz, kaolin, aluminum nitride, $TiO_2$, calcium sulfate, $B_2O_3$, alumina, glass flakes, beads, whiskers or filaments, nickel powder and metal or graphite fibers; hydrolytic stabilizers; lubricants such as fatty acids, fatty alcohols, esters, fatty amides, metallic stearates, paraffinic and microcrystalline waxes, silicones and orthophosphoric acid esters; mold release agents such as fine-particle or powdered solids, soaps, waxes, silicones, polyglycols and complex esters such as trimethylolpropane tristearate or pentaerythritol tetrastearate; pigments, dyes and colorants; plasticizers such as esters of dibasic acids (or their anhydrides) with monohydric alcohols such as o-phthalates, adipates and benzoates; heat stabilizers such as organotin mercaptides, an octyl ester of thioglycolic acid and a barium or cadmium carboxyalte; ultraviolet light stabilizers such as a hindered amine, an o-hydroxy-phenylbenzotriazole, a 2-hydroxy,4-alkoxybenzophenone, a salicylate, a cyanoacrylate, a nickel chelate and a benzylidene malonate and oxalanilide. A preferred hindered phenolic antioxidant is Irganox TM 1076 antioxidant, available from Ciba-Geigy Corp. Such additives, if used, typically do not exceed 45 percent by weight of the total composition, and are advantageously from about 0.001 to 15 percent, preferably from about 0.01 to 10 percent and more preferably from about 0.1 to 10 percent, by weight of the total composition.

To illustrate the practice of this invention, examples of several preferred embodiments are set forth below, however, these examples (Examples 1-3) do not in any manner restrict the scope of this invention. Some of the particularly desirable features of this invention may be seen by contrasting the characteristics of Examples 1-3 with those of various controlled formulations (Controls A-H) which do not possess the features of, and are not therefore embodiments of, this invention.

The compositions of Examples 1-3 and Controls A-H are prepared by mixing the dry components on paint shaker for 5 minutes, and then feeding the dry-blended formulation to a 30 mm Werner & Pfleiderer extruder set at 280° C. barrel zone temperture, 250 rpm and 70-85% torque. The extrudate is cooled in the form of strands and is then comminuted as pellets. The pellets are dried in an air draft oven for 3 hours at 120° C., and are then used to prepare test specimens on a 70 ton Arburg molding machine having temperature zone settings of 150° C., 200° C., 250° C., 250° C. and 250° C., and a mold temperature of 80° C.

The formulation content of Example 1 and Controls A-E is given below in Table I, in parts by weight of the total composition. In Table I:

"Polycarbonate" is a Bisphenol-A polycarbonate having a weight average molecular weight of 28,000;

"LLDPE I" is a linear low density polyethylene having a melt index, according to ASTM D 1238, of 2;

"LLDPE II" is a linear low density polyethylene having a melt index, according to ASTM D 1238, of 26;

"EPR" is a copolymer of 45 weight percent ethylene and 55 weight percent propylene;

"MBS" is methacrylate/styrene/butadiene copolymer (Paraloid TM 8963 from Rohm & Haas); and "ITP" is a substantially linear ethylene polymer, as described above as component (b), having a density of approximately 0.87 g/cm$^3$.

The following tests are performed on Example 1 and Controls A-E, and the results of these test are also shown in Table I:

Impact resistance is measured by the Izod test ("Izod") according to ASTM Designation D 256-84 (Method A) at $-35°$ C. The notch is 10 mils (0.254 mm) in radius. Impact is perpendicular to the flow lines in the plaque from which the bar is cut. Izod results are reported in ft-lb/in.

Impact resistance is also measured by the Izod test ("Weldline") according to ASTM Designation D 256-84 (Method A) at room temperature (23°-25° C.), but with respect to a sample which is formed with a butt weld in a double gated mold. The sample is unnotched, and it is placed in the vise so that the weld is 1 mm above the top surface of the vise jaws. Weldline results are also reported in ft-lb/in.

Percent elongation at break is measured in accordance with ASTM Designation D 638-84 at a rate of 2"/minute with respect to a tensile bar which has been placed under 0.5 percent strain while submerged in a bath of 60 weight percent isooctane and 40 weight percent toluene for 5 minutes. After removal from the bath the sample is allowed to dry without strain for at least 24 hours before testing. Percent elongation at break is also measured with respect to a tensile bar which has not been subjected to the solvent bath. Results are expressed as "Elongation/soak" and "Elongation/dry", respectively.

Percent of length retention ("Rentention") is calculated by dividing the percent elongation value obtained as to a sample which has received the solvent bath, as described above (Elongation/soak), by the percent elongation value obtained as to sample of the same formulation which has not received the solvent bath (Elongation/dry).

"Viscosity" is determined by placing a disc molded from the composition between two plates, each of which rotates reciprocatingly through an arc of 0.1 radian with a frequency of one second while the disc is held at 270° C. The power consumption required to maintain the stated arc and frequency is proportional to the viscosity of the composition. Viscosity is stated in poise.

TABLE I

Content and Properties of Controls A-E and Example I

| | Controls | | | | | Example 1 |
|---|---|---|---|---|---|---|
| | A | B | C | D | E | |
| Polycarbonate | 100 | 95 | 95 | 95 | 95 | 95 |
| LLDPE I | | 5 | | | | |
| LLDPE II | | | 5 | | | |
| EPR | | | | 5 | | |
| MBS | | | | | 5 | |
| ITP | | | | | | 5 |
| $-35°$ C. Izod (ft-lb/in) | 2.8 | 1.9 | 2.3 | 3.7 | 12.3 | 10.6 |
| RT Weldline (ft-lb/in) | 45 | 5 | 8 | | 38 | 26 |
| Elongation/soak (%) | 8 | 88 | 98 | 159 | 11 | 120 |
| Elongation/dry (%) | 210 | 96 | 105 | 169 | 44 | 112 |
| Retention (%) | 4 | 92 | 93 | 94 | 25 | 107 |
| Viscosity (poise) | | | | | 10,000 | 8,500 |

The data in Table I demonstrate that while polycarbonate has high impact strength in certain aspects, it has very little solvent resistance. Addition of an olefin-based modifier to polycarbonate, such as LLDPE or EPR, definitely results in a composition having solvent resistance which is much improved over that of polycarbonate, but what little impact strength polycarbonate possesses by itself is almost completely sacrificed, as indicated by the weldline values. Use of MBS as a modifier in a composition with polycarbonate produces a material which has unassailable impact strength, but which has poor solvent resistance. By contrast, Example 1, in which polycarbonate is blended with a substantially linear ethylene polymer, shows a desirable balance of relatively good values in both the properties of impact resistance and solvent resistance, and overcomes the problem caused by previous modifiers which, while improving one property of polycarbonate, caused an offsetting decline in other properties. Example 1 shows no tendency toward delamination, and the lower viscosity of Example 1 makes it easier to process.

The formulation content of Examples 2–3 and Controls F-H is given below in Table II, in parts by weight of the total composition. In Table II:

"Polycarbonate" is a Bisphenol-A polycarbonate having a weight average molecular weight of 23,000;

"MBS" is methacrylate/styrene/butadiene copolymer (Paraloid ™ 8963 from Rohm & Haas);

"HDPE" is high density polyethylene;

"GRC" is a grafted core-shell elastomer prepared from acrylonitrile, butadiene and styrene; and "ITP" is a substantially linear ethylene polymer, as described above as component (b), having a density of approximately 0.87 g/cm$^3$.

The following tests are performed on Example 2–3 and Controls F-H, and the results of these test are also shown in Table II:

The Izod and Weldline tests are performed as described above. "PP" indicates that the impact is perpendicular to the flow lines in the plaque from which the bar is cut. "PL" indicates that the impact is parallel to the flow lines in the plaque from which the bar is cut.

Deflection temperature under load ("D.T.U.L.") is measured in accordance with ASTM Designation D 648-82 at 66 psi.

Tensile strength at yield ("Yield"), tensile strength at break ("Break"), and-percent elongation at break ("Elongation"), and tensile modulus ("T. Modulus") are all determined according to ASTM Designation D 638. All except elongation are reported in psi.

Flexural modulus ("F. Modulus") is determined according to ASTM D 790. Results are reported in psi.

TABLE II

Content and Properties of Controls F-H and Examples 2-3

|  | Control F | Example 2 | Control G | Control H | Example 3 |
|---|---|---|---|---|---|
| Polycarbonate | 95 | 95 | 92 | 92.5 | 92.5 |
| MBS | 2.5 | 2.5 | | | |
| HDPE | 2.5 | | | 2.5 | |
| GRC | | | 8 | 5 | 5 |
| ITP | | 2.5 | | | 2.5 |
| Izod, 23° C., PP (ft-lb/in) | 11.8 | 11.7 | 12.7 | 11.7 | 11.9 |
| Izod, −30° C., PL (ft-lb/in) | 4.3 | 11.8 | 4.3 | 4.1 | 6.5 |
| Izod, −30° C., PP (ft-lb/in) | 4.4 | 11.8 | 4.1 | 4.0 | 8.7 |
| Weldline, RT (ft-lb/in) | 30.1 | 23.8 | 12.4 | 20.4 | 20.8 |
| D.T.U.L. (°C.) | 123.5 | 123.3 | 123.3 | 122.3 | 121.8 |
| Yield (psi) | 8040 | 8110 | 8260 | 7880 | 7760 |
| Break (psi) | 7096 | 7167 | 7405 | 7408 | 8002 |
| Elongation (%) | 100 | 100 | 110 | 112 | 128 |
| T. Modulus (psi) | 248,000 | 250,000 | 259,000 | 236,000 | 231,000 |
| F. Modulus (psi) | 329,000 | 327,000 | 340,000 | 324,000 | 330,000 |

A review of the data in Table II concerning Controls F-H and Examples 2-3 indicates that blending even a small amount of a substantially liner ethylene polymer in a polycarbonate composition containing a conventional impact modifier yields a composition having a desirable balance of several properties. For instance, when HDPE in Control F is replaced with a substantially liner ethylene polymer, the resulting composition, Example 2, shows distinctly improved low temperture Izod. While there is a decrease in Weldline as to Example 2, the value remains at an acceptable level, and other properties show essentially comparable values. Similarly, when a portion of the GRC in Control G, or all of the HDPE in Control H, is replaced with a substantially liner ethylene polymer, the resulting composition, Example 3, shows improved low temperature Izod, tensile strength at break and Elongation while maintaining an acceptable level of performance as to the other properties. In addition, Examples 2-3 show no tendency toward delamination.

What is claimed is:

1. A composition of matter comprising, in admixture, (a) polycarbonate, and (b) a substantially linear ethylene polymer which has:
   (i) a melt flow ratio, $I_{10}/I_2$, which is greater than or equal to 5.63;
   (ii) a molecular weight distribution, $M_w/M_n$, which is less than or equal to the value: $(I_{10}/I_2) - 4.63$; and
   (iii) a critical shear rate at onset of surface melt fracture of at least 50 percent greater than the critical shear rate at the onset of surface melt fracture of a linear olefin polymer having about the same $I_2$ and same $M_w/M_n$.

2. The composition of claim 1 further comprising a styrenic copolymer.

3. The composition of claim 2 wherein the styrenic copolymer is a vinyl aromatic/vinyl nitrile copolymer.

4. The composition of claim 2 wherein the styrenic copolymer is a styrene/acrylonitrile copolymer.

5. The composition of claim 2 wherein the styrenic copolymer is a rubber-modified vinyl aromatic/vinyl nitrile copolymer.

6. The composition of claim 5 wherein the rubber-modifier in the rubber-modified vinyl aromatic/vinyl nitrile copolymer is polymerized from a diene, an olefin monomer, an alkyl acrylate or methacrylate, or a mixture thereof, or a mixture of one or more of the foregoing with a vinyl aromatic compound or a vinyl nitrile compound.

7. The composition of claim 5 wherein the rubber-modified vinyl aromatic/vinyl nitrile copolymer is acrylonitrile/butadiene/styrene copolymer.

8. The composition of claim 1 further comprising an elastomeric impact modifier.

9. The composition of claim 8 wherein the elastomeric impact modifier is a block copolymer prepared from a vinyl aromatic compound and a diene.

10. The composition of claim 9 wherein the vinyl aromatic/diene block copolymer is hydrogenated.

11. The composition of claim 8 wherein the elastomeric impact modifier is a core-shell grafted copolymer.

12. The composition of claim 11 wherein the core-shell grafted copolymer is characterized in that
  (a) its core comprises a conjugated diene or a $C_1$–$C_{15}$ acrylate, said core having a glass transition temperature below about 0° C. and
  (b) its grafted phase comprises a carboxylic acid ester of a saturated aliphatic alcohol, acrylic or methacrylic acid, a vinyl nitrile compound, a vinyl aromatic compound, or a mixture thereof.

13. The composition of claim 1 further comprising a polyester.

14. The composition of claim 13 further comprising a styrenic copolymer.

15. The composition of claim 14 wherein the styrenic copolymer is a rubber-modified vinyl aromatic/vinyl nitrile copolymer.

16. The composition of claim 13 further comprising an elastomeric impact modifier selected from a vinyl aromatic/diene block copolymer, a core-shell grafted copolymer, or a mixture thereof.

17. The composition of claim 1 further comprising an olefin molding polymer selected from the group consisting of high density polyethylene, low density polyethylene, linear low density polyethylene, ultra low density polyethylene, polypropylene, polyisobutylene, ethylene/acrylic acid copolymer, ethylene/vinyl acetate copolymer, ethylene/vinyl alcohol copolymer, ethylene/carbon monoxide,copolymer, ethylene/propylene/carbon monoxide copolymer, ethylene/carbon monoxide/acrylic acid copolymer, polystyrene, poly(vinyl chloride), and mixtures thereof.

18. The composition of claim 1 wherein the substantially linear ethylene polymer has a density of about 0.860 to about 0.900 g/cm$^3$.

19. The composition of claim 1 wherein the substantially linear ethylene polymer has a melt flow ratio, $I_{10}/I_{12}$, of about 6.5 to 15.

20. The composition of claim 1 wherein the substantially linear ethylene polymer has a molecular weight distribution ($M_w/M_n$) of about 1.5 to 2.5.

21. The composition of claim 1 further comprising a filler.

22. The composition of claim 1 further comprising one or more ignition resistance additives selected from halogenated hydrocarbons, halogenated carbonate oligomers, halogenated diglycidyl ethers, organophosphorous compounds, fluorinated olefins, antimony oxide and metal salts of aromatic sulfur compounds.

23. The composition of claim 1 in the form of a molded or extruded article.

24. The composition of claim 2 wherein the substantially linear ethylene polymer has a density of about 0.860 to about 0.900 g/cm$^3$.

25. The composition of claim 13 wherein the substantially linear ethylene polymer has a density of about 0.860 to about 0.900 g/cm$^3$.

26. The composition of claim 2 wherein the substantially linear ethylene polymer has a melt flow ratio, $I_{10}/I_2$, of about 6.5 to 15.

27. The composition of claim 13 wherein the substantially linear ethylene polymer has a melt flow ratio, $I_{10}/I_2$, of about 6.5 to 15.

28. The composition of claim 2 wherein the substantially linear ethylene polymer has a molecular weight distribution ($M_w/M_n$) of about 1.5 to 2.5.

29. The composition of claim 13 wherein the substantially linear ethylene polymer has a molecular weight distribution ($M_w/M_n$) of about 1.5 to 2.5.

30. The composition of claim 20 wherein the substantially linear ethylene polymer has a melt flow ratio, $I_{10}/I_2$, of about 7 to 10.

31. The composition of claim 28 wherein the substantially linear ethylene polymer has a melt flow ratio, $I_{10}/I_2$, of about 7 to 10.

32. The composition of claim 29 wherein the substantially linear ethylene polymer has a melt flow ratio, $I_{10}/I_2$, of about 7 to 10.

33. The composition of claim 1 wherein the substantially linear ethylene polymer is a copolymer of ethylene and one or more alpha-olefins of 3 to about 20 carbon atoms.

34. The composition of claim 2 wherein the substantially linear ethylene polymer is a copolymer of ethylene and one or more alpha-olefins of 3 to about 20 carbon atoms.

35. The composition of claim 13 wherein the substantially linear ethylene polymer is a copolymer of ethylene and one or more alpha-olefins of 3 to about 20 carbon atoms.

36. The composition of claim 1 wherein the substantially linear ethylene polymer is a copolymer of ethylene and 1-octene.

37. The composition of claim 2 wherein the substantially linear ethylene polymer is a copolymer of ethylene and 1-octene.

38. The composition of claim 13 wherein the substantially linear ethylene polymer is a copolymer of ethylene and 1-octene.

39. The composition of claim 36 wherein the substantially linear ethylene polymer has a melt flow ratio, $I_{10}/I_2$, of about 7 to 10, and a molecular weight distribution ($M_w/M_n$) of about 1.5 to 2.5.

40. The composition of claim 37 wherein the substantially linear ethylene polymer has a melt flow ratio, $I_{10}/I_2$, of about 7 to 10, and a molecular weight distribution ($M_w/M_n$) of about 1.5 to 2.5.

41. The composition of claim 38 wherein the substantially linear ethylene polymer has a melt flow ratio, $I_{10}/I_2$, of about 7 to 10, and a molecular weight distribution ($M_w/M_n$) of about 1.5 to 2.5.

42. The composition of claim 2 in the form of a molded or extruded article.

43. The composition of claim 13 in the form of a molded or extruded article.

* * * * *

UNITED STATES PATENT AND TRADEMARK OFFICE
CERTIFICATE OF CORRECTION

PATENT NO. : 5,416,148
DATED : May 16, 1995
INVENTOR(S) : Farah et al.

It is certified that error appears in the above-identified patent and that said Letters Patent is hereby corrected as shown below:

Title Page, column 2, References Cited, delete the second occurrence of "5,278,272 1/1994 Lai et al."

Claim 17, line 46, "ethylene/carbon monoxide,copolymer," should correctly read --ethylene/carbon monoxide copolymer,--.

Claim 19, line 55, "$I_{10}/I_{12}$" should correctly read --$I_{10}/I_2$--.

Signed and Sealed this

Twenty-first Day of May, 1996

Attest:

BRUCE LEHMAN

*Attesting Officer*  *Commissioner of Patents and Trademarks*

REEXAMINATION CERTIFICATE (3745th)

United States Patent [19]
Farah et al.

[11] B1 5,416,148
[45] Certificate Issued  Mar. 2, 1999

[54] BLENDS OF POLYCARBONATE AND ETHYLENE POLYMERS

[75] Inventors: Hani Farah, Sugarland; Michael K. Laughner, Lake Jackson; Chai-Jing Chou, Missouri City; Morgan M. Hughes, Angleton, all of Tex.

[73] Assignee: The Dow Chemical Company, Midland, Mich.

Reexamination Request:
No. 90/004,739, Aug. 20, 1997

Reexamination Certificate for:
Patent No.: 5,416,148
Issued: May 16, 1995
Appl. No.: 304,036
Filed: Sep. 9, 1994

Certificate of Correction issued May 21, 1996.

[51] Int. Cl.$^6$ .................. C08J 8/00; C08K 3/10
[52] U.S. Cl. ............... 524/409; 525/64; 525/146; 525/147
[58] Field of Search ............... 524/409, 64, 146, 524/147

[56] References Cited

U.S. PATENT DOCUMENTS

| | | |
|---|---|---|
| 3,431,224 | 3/1969 | Goldblum . |
| 3,780,140 | 12/1973 | Hammer . |
| 3,813,358 | 5/1974 | O'Connell . |
| 4,122,131 | 10/1978 | Bussink et al. . |
| 4,172,859 | 10/1979 | Epstein . |
| 4,245,058 | 1/1981 | Liu . |
| 4,384,076 | 5/1983 | Ohara et al. . |
| 4,410,662 | 10/1983 | Witman et al. . |
| 4,430,476 | 2/1984 | Liu . |
| 4,444,950 | 4/1984 | Sakano et al. . |
| 4,496,693 | 1/1985 | Rosenquist et al. . |
| 4,513,119 | 4/1985 | Liu . |
| 4,537,930 | 8/1985 | Bussink et al. . |
| 4,638,033 | 1/1987 | Boutni et al. . |
| 4,710,534 | 12/1987 | Liu . |
| 4,843,129 | 6/1989 | Spenadel et al. . |
| 4,894,423 | 1/1990 | Farah et al. . |
| 5,272,236 | 12/1993 | Lai et al. ............... 526/348.5 |
| 5,278,272 | 1/1994 | Lai et al. ............... 526/348.5 |
| 5,346,963 | 9/1994 | Hughes et al. ............... 525/285 |
| 5,681,897 | 10/1997 | Silvis et al. . |

FOREIGN PATENT DOCUMENTS

| | | |
|---|---|---|
| 0122601 | 10/1984 | European Pat. Off. . |
| 0416815A2 | 8/1990 | European Pat. Off. . |
| 1363402 | 8/1974 | United Kingdom . |
| WO91/06859 | 3/1994 | WIPO . |

OTHER PUBLICATIONS

Derwent Abstract 85–200896/33.
Derwent Abstract 83–24144K/10.
Derwent Abstract 82–77367E/37.

*Primary Examiner*—Morton Foelak

[57] ABSTRACT

A blend of polycarbonate and a substantially linear ethylene polymer which has a desirable balance of impact and solvent resistance properties.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–43 is confirmed.

* * * * *